United States Patent

[11] 3,612,925

| [72] | Inventor | Roy L. Swanke<br>Newington, Conn. |
|---|---|---|
| [21] | Appl. No. | 13,341 |
| [22] | Filed | Feb. 24, 1970 |
| [45] | Patented | Oct. 12, 1971 |
| [73] | Assignee | Dynamics Corporation of America<br>New York, N.Y. |

[54] INDUCTION MOTOR ROTOR AND METHOD OF MAKING SAME
11 Claims, 11 Drawing Figs.

| [52] | U.S. Cl. | 310/42, 310/211 |
|---|---|---|
| [51] | Int. Cl. | H02k 3/06 |
| [50] | Field of Search | 310/211, 210, 42; 29/598, 205 |

[56] References Cited

UNITED STATES PATENTS

| 2,387,073 | 10/1945 | Horlacher | 310/211 |
| 2,514,116 | 7/1950 | Baker | 310/211 X |
| 2,786,953 | 3/1957 | Schaefer | 310/166 |
| 1,875,204 | 8/1932 | Apple | 310/235 |
| 1,919,995 | 7/1933 | Wry | 29/598 |
| 2,012,021 | 8/1935 | Petersen | 310/211 X |

FOREIGN PATENTS

| 704,085 | 3/1941 | Germany | 310/211 |

Primary Examiner—D. X. Sliney
Attorney—Harbaugh and Thomas

ABSTRACT: An induction motor rotor in which conducting bars and end rings are preformed ladderlike for insertion in the slots and the bars have the same circumferential widths as the lands of the laminated core between them and substantially the same radial thickness as the radial depth of the slots in which they rest. The bars are stamped without waste of material from heavy strip stock to provide interdigitating fingers whose length is at least 50 percent of the slot length and provide identical half-ladder units which are then shaped to the rotor slot pattern and inserted in the rotor slots where they are induction soldered for circuit continuity and conductivity.

PATENTED OCT 12 1971 3,612,925

INVENTOR
ROY L. SWANKE
By Harbaugh & Thomas
Attorneys

INVENTOR
ROY L. SWANKE
By Harbaugh & Thomas
Attorneys

INDUCTION MOTOR ROTOR AND METHOD OF MAKING SAME

BACKGROUND OF THE INVENTION

Heretofore it is the general practice in making rotors for induction motors to sandwich the rotor lamination stack between two electrically conductive end members, insert electrically conductive bars in the circumferentially spaced rotor slots and their ends soldered at their opposite ends to the end members. The laminations are press fitted on the armature shaft, or receive bearings which are journaled on a stationary shaft and are balanced for nonvibratory rotation. The slots may be disposed parallel to the shaft or askew with respect thereto, for well-known magnetic flux flow reasons, but the cost of production is a competitive consideration involving soldering copper in places with inconsistently recurring imbalances which require dynamic as well as static balancing.

Aluminum has been used for bars, but to make adequate connections the aluminum is molded in situ at a substantial expense of heating, cooling and balancing. Other structural arrangements have been suggested involving shaped bars for each slot that are later integrated, but a looseness of bars in the slots is experienced and objections involving price, usefulness and stability have been encountered.

Reference is made to Gintovt Pat. Ser. No. 3,371,410 for a further appraisal of earlier developments.

PRESENT INVENTION

In the present invention the bars are stamped without waste from narrow, heavy copper strip into two comblike or half-ladder units of predetermined lengths. The two units are separated in the stamping operation to free their teeth from interdigitation and are then shaped to match the curvature of the rotor whereby the teeth serve as conductor bars when pressed radially or axially into place in the rotor slots while the rounded end connector serves as an end ring electrical conductor of the secondary winding cage.

Preferably the conductor bars are as wide as the space between them and in length are at least half the length of the lamination stack of the rotor in one embodiment, and greater than the length of the lamination stack in another embodiment.

In the one embodiment two cage units have their tooth ends brought from opposite ends of the stack into abutment with each other in the slots, two teeth in each slot making up a single bar. In the other embodiment the teeth are inserted from one end of the stack to extend the full length of the stack and appreciably therebeyond. In both embodiments either end of the stack can serve as the production indexing end.

In either embodiment insertion can be by the teeth being brought into parallel, cylindrical relationship and then forced axially into place to extend the length of the slot. In said other embodiment the projecting ends are swaged radially inwardly about the edge of a conductor ring, and in both embodiments an end ring conductor can be swaged radially inwardly with or without the hub of a fan secured thereby in place, it being appreciated that the fan hub can serve as an end ring conductor. Or, the teeth can be disposed to form a frustum of a cone after which the teeth are forced progressively radially inwardly into the slots either by radial clamping or axial draw swagging. Wherever there is an engagement between electrically conductive elements, the elements are induction soldered for circuit continuity and electrical conductivity.

The ease of manufacture with a wide assortment of different available production machines and techniques found in most plants will be appreciated as will be the accuracy, conductivity, ruggedness, and economical simplicity of minimal parts thereby provided. The slots are filled with conductive material without the usual conventional distortion of the bars and a readily balanced rotor is attained in the process.

Other and further objects including an improved, fractional horsepower squirrel cage rotor performance is provided which can provide improved flux densities with minimal eddy currents.

DESCRIPTION OF THE DRAWINGS

The invention will be better understood from the following description of two embodiments shown in the accompanying drawing in which.

THE PREFERRED EMBODIMENTS

Figure 2:
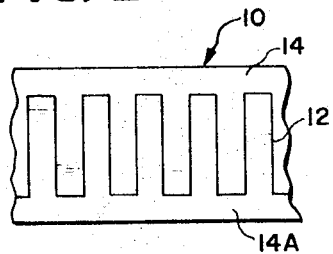
FIG. 2 is a fragmentary plan view of a strip of electrically conductive material from which the rotor winding cage is made.
Figure 3:
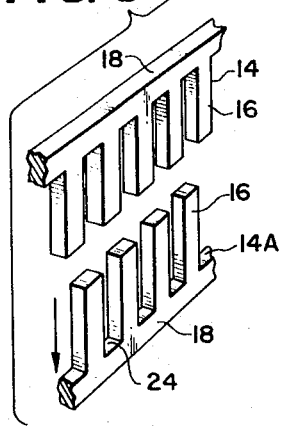
FIG. 3 is a fragmentary perspective view of the conductive cage elements after the severance indicated in FIG. 2.

Referring now to the drawings in further detail a portion of heavy copper strip stock 10 is shown in FIG. 2 indicating the shearing line 12 of a conventional stamping operation whereby two comblike units 14 and 14A will be formed from the blank and severed from each other in the shape shown in FIG. 3 having parallel teeth 16 supported and electrically connected by a backing edge member 18 along the end thereof. The teeth 16 are free at their other end for insertion into slots of an induction motor rotor for use as electrical conduction bars with the edge member serving as an end ring conductor.

The thickness of the strip and, by the same token, the thickness of the teeth 16 may vary depending on the circle mils rating desired, but the width of the teeth of the two units 14 and 14A are the same. There is no waste of material and the length of the teeth can either be at least one-half the length of the stack or longer than the length of the stack 20 to be received in circumferentially spaced longitudinal slots 22 between paramagnetic lands 24 of equal widths.

Figure 4:
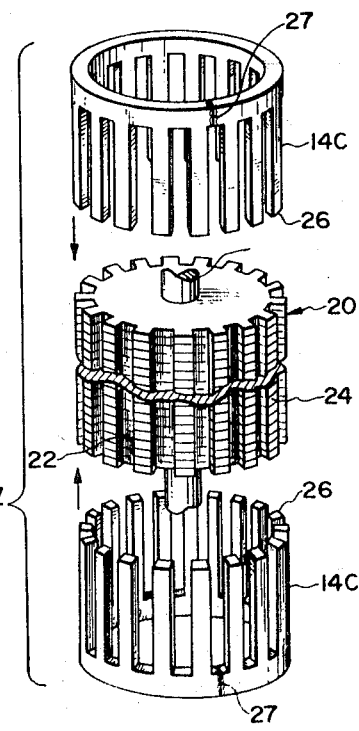
FIG. 4 is an exploded view in perspective of the formed cage elements and the rotor lamination stack prior to assembly indicating the assembly procedure.
Figure 5:
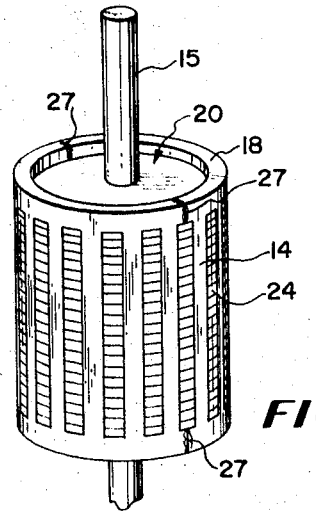
FIG. 5 is the assembled elements of FIG. 4 when the cage elements are inductively soldered and prior to the final step producing the product as shown in FIG. 1.
Figure 8:
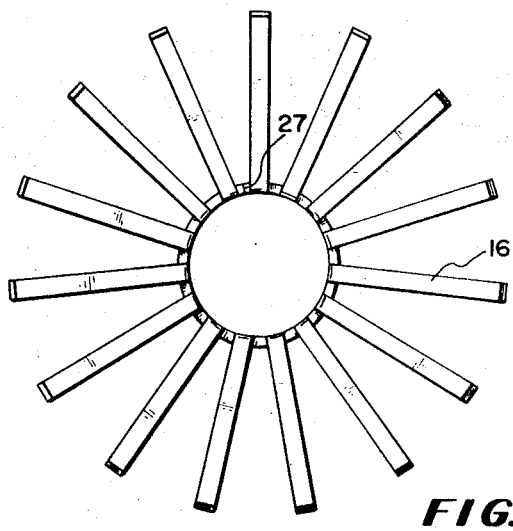
FIG. 8 is another embodiment of a single cage unit where the bars are longer than the length of the rotor stack.

The essentially flat comb units 14 and 14A produced by the stamping operation are curled or formed to provide a cage unit product defining a surface of revolution, either cylindrical 14C (FIG. 4) or as a frustum of a cone 14F (FIG. 8), for the assembly of either one or more units to provide a conductor cage. The teeth 16 of the two are located to dovetail with the slots 22 either from opposite ends as shown in FIG. 4 by slipping them into place with axial movement and pressure until their inner ends 26 engage or, as shown in FIG. 8, by flexing them radially progressively into the slots. Thereafter all contacts are induction soldered to hold all parts in place and provide the desired electrical conductivity and circuit continuity.

Figure 6:
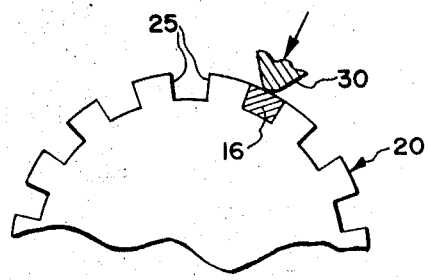
FIG. 6 indicates the step in which the conduction bars of the conductive cage are swaged against centrifugal forces and to balance the rotor.
Figure 1:
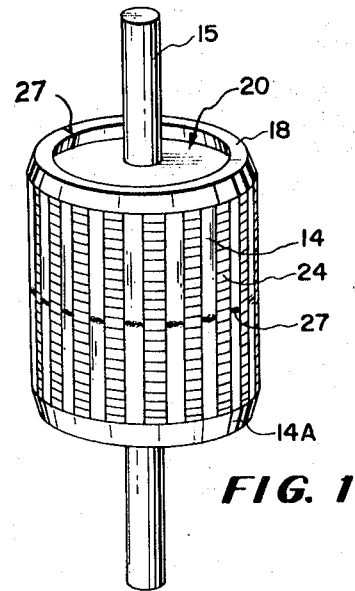
FIG. 1 is a perspective view of a fractional horsepower induction rotor of the squirrel cage type manufactured in accordance with the invention.
Figure 11:
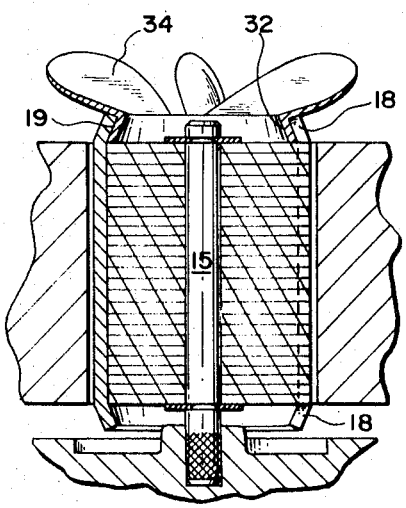
FIG. 11 is a sectional view of another embodiment in a fan is incorporated in either rotor in the process of manufacture.

It is to be noted that the slots 22 have parallel sidewalls 25 (FIG. 6) as distinguished from radially disposed walls and after the bars are located therein they can be upset mildly by a tool 30 driven in a radial direction to marginally interlock the stock of the bars 16 with the stamp cut walls 25 of the rotor stack laminations against centrifugal forces and with the rim edge 18 located beyond the end of the rotor stack. These rims can be swaged inwardly when the bars are swaged inwardly since the work movement for both is in the same direction. In this connection the upwardly tapering hub 32 of a cooling fan 34 can be locked in driven position by the contraction of the rim edge 18 and induction soldered as shown at 19 in FIG. 11.

Figure 7:
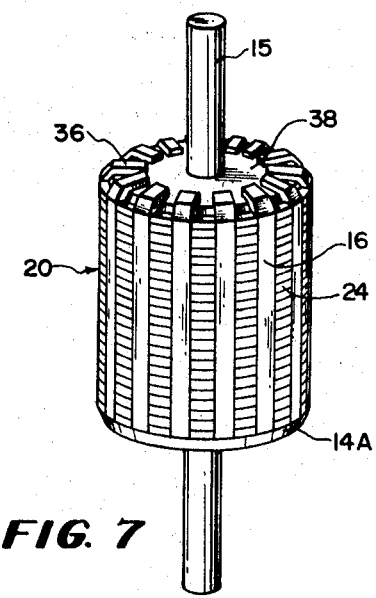
FIG. 7 is a perspective view from one end of the rotor and similar to FIG. 1 illustrating another embodiment of the invention.
Figures 9, 10:
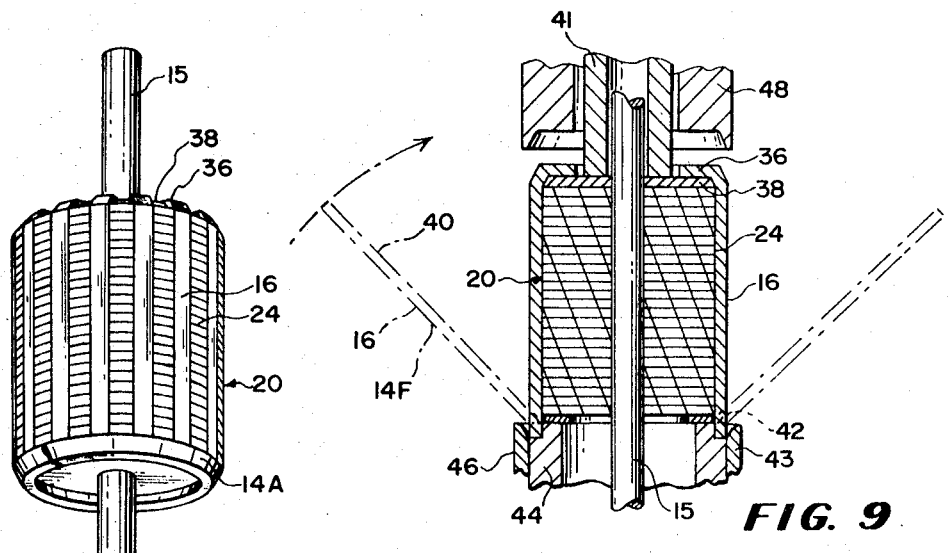
FIG. 9 is a side elevational view partly in section showing the assembly steps of the elements shown in FIG. 8.
FIG. 10 is a perspective view of the rotor shown in FIG. 7 taken from the other end of the rotor.

In event the teeth 19 are long enough to extend beyond the end of the rotor stack 20 as shown in FIGS. 7 to 10, the hub 32 of the fan 34 can be of high-electrical conductivity and the extending tooth ends 36 can be employed to hold the fan in place as induction soldered thereto instead of employing an electrically conductive washer 38 as indicated in FIGS. 7 and 9.

In fashioning the embodiment shown in FIG. 9 a cylindrical cage having long teeth rolled to a cylindrical shape as shown in FIG. 4 from flat blanks of FIG. 3 and are held at the rim end by an anvil member 44 and the teeth 16 are spread radially outwardly to a position as shown at 40 to receive the stack 20 marginally resting at its end on the rim 18 as at 42 between the teeth 16. Thereupon a tubular clamp 42 (FIG. 4) compresses the lamination stack with the bases of the teeth 16 already started in the slots and a swagging sleeve 43 is forced upwardly to progressively move the teeth 16 into the slots. Thereafter the upper ends 36 are swaged inwardly by a die 48 to compact the assembly in clamped and clamping relation. The assembly is then released, fluxed and soldered in an induction furnace, cooled, tooled by the bar swagging tool 30, and dynamically balanced preferably by upsetting the side of the rim 18 further inwardly where the eccentric weight is the heaviest.

Where askew rotor stacks are provided having helically arranged slots the pattern of the shearing line 12 is merely changed from the 90° angles shown to suitable complementary angles that would be involved with the helical angle. This further illustrates the versatility of the invention in the manufacture of induction rotors having different characteristics both structurally and otherwise.

Having thus described several embodiments of the invention what is claimed is:

1. The method of making an induction motor rotor, comprising, forming a cylindrical core of paramagnetic material defining longitudinal slots circumferentially spaced from each other a distance substantially equal to their circumferential width, stamping a strip of heavy electrical conductive material to form two comblike units having teeth whose widths are substantially equal and are integrally connected along one of their ends by a conductor, curling the units to a form defining a surface of revolution to bring the teeth in juxtaposition with respect to said slots, forcing said teeth of at least one unit into said slots, and joining the other ends of the teeth in electrically conductive circuit continuity.

2. The method defined in claim 1 in which the teeth forcing step includes forcing said teeth in an axial direction longitudinally of the slots.

3. The method of claim 1 in which said juxtaposition includes the moving of said teeth radially from an inclined position progressively into said slots.

4. The method of making an induction motor rotor, comprising, forming a cylindrical core of paramagnetic material defining longitudinal slots circumferentially spaced from each other a distance substantially equal to their circumferential width, stamping a strip of heavy electrical conductive material to form two comblike units having teeth whose widths are substantially equal and are integrally connected along one end, curling the units to a form defining a surface of revolution to bring the teeth in juxtaposition with respect to said slots, forcing said teeth into said slots, and induction soldering the elements where they are in engagement contact with each other to provide circuit continuity and electrical conduction.

5. The method defined in claim 1 in which the teeth of the two units are collectively of a length substantially equal to the length of the rotor stack and advancing them in the slots, forcing the aligned pairs of teeth into terminal engagement with each other in each slot, and soldering their contacting ends for electrical conductivity.

6. The method defined in claim 5 in which the teeth of the two units are of equal length one-half the length of the rotor stack.

7. The method defined in claim 1 including dynamically balancing the rotor by localized radially displacing the conductive material.

8. For use to dovetail in the slots of a rotor of an induction motor a plurality of preformed comblike cage units of electrically conductive material whose backing edge is of a length approximately that of the circumference of the rotor and whose teeth are of a length less than the length of the slots in the rotor, said backing edge being shaped to match the curvature of the rotor with its ends in end-abutting relationship to serve as electrical conductive end rings and said teeth are received in end engaged relation to serve as conductor bars in which the width of each tooth element is equal to the space between them.

9. For use to dovetail in the slots of a rotor of an induction motor, at least two preformed comblike cage units of electrically conductive material employed with each rotor and whose teeth are of a length less than the length of the slots and the units are shaped to match the curvature of the rotor to serve as conductor bar portions in which the width of each tooth element is equal to the space between them, said units having their teeth in end abutting relationship and all teeth are substantially equal in size and shape with abutting teeth providing a bar length equal to the length of the slots.

10. The method defined in claim 1 including dynamically balancing the rotor by radially displacing the conductor at localized points.

11. In an induction motor a rotor comprising a lamination stack having longitudinally extending slots and lands that circumferentially are of the same width, conduction bars in said slots integrally stamped from heavy strip stock with an end ring conductor at least at one end of the stack, the circumferential width of the bars being equal to that of the lands, said bars being swaged in a radial direction in the slots and dynamically balanced by localized radial displacement of the end ring conductor.